United States Patent Office 2,996,080
Patented Aug. 15, 1961

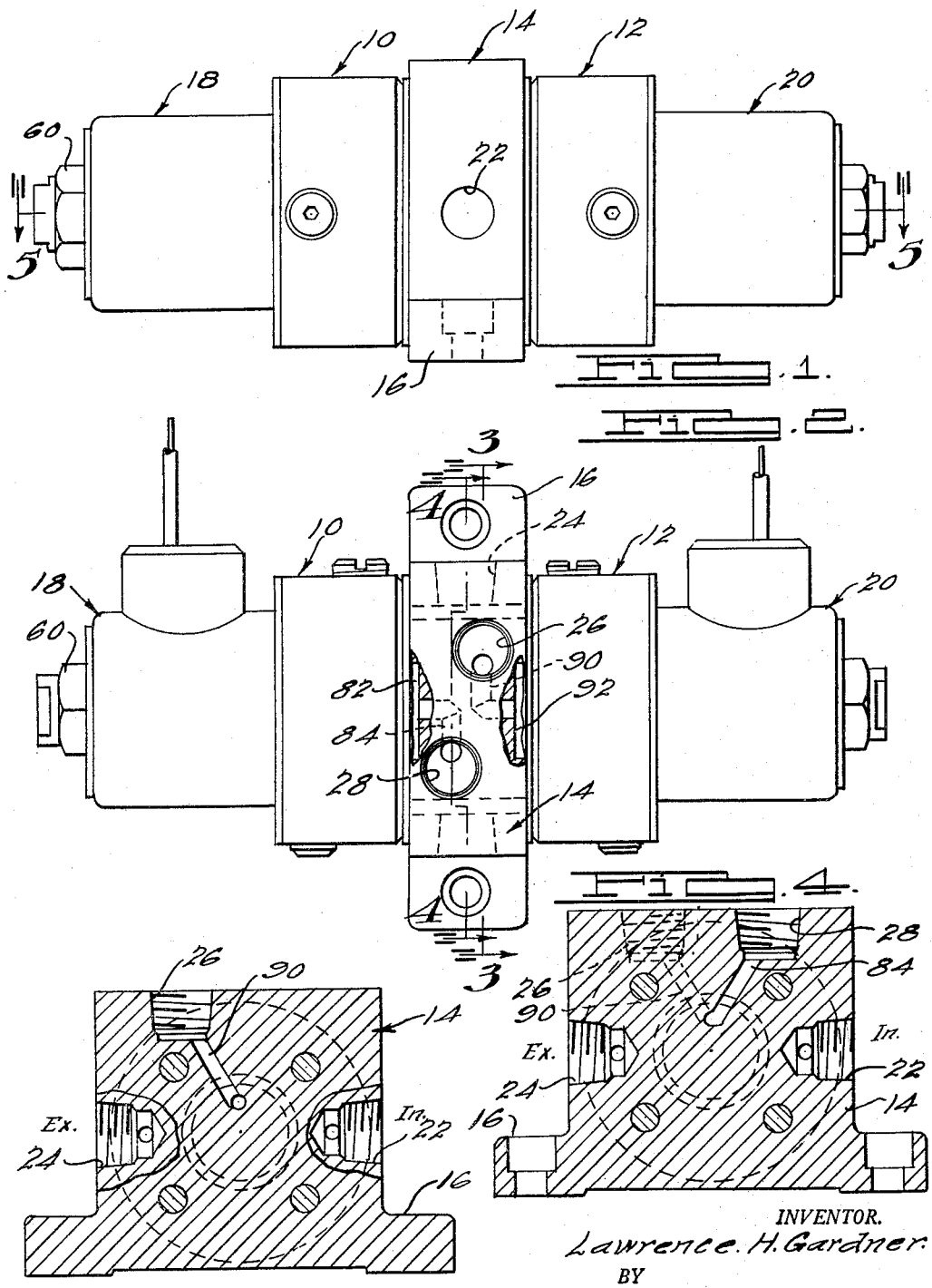

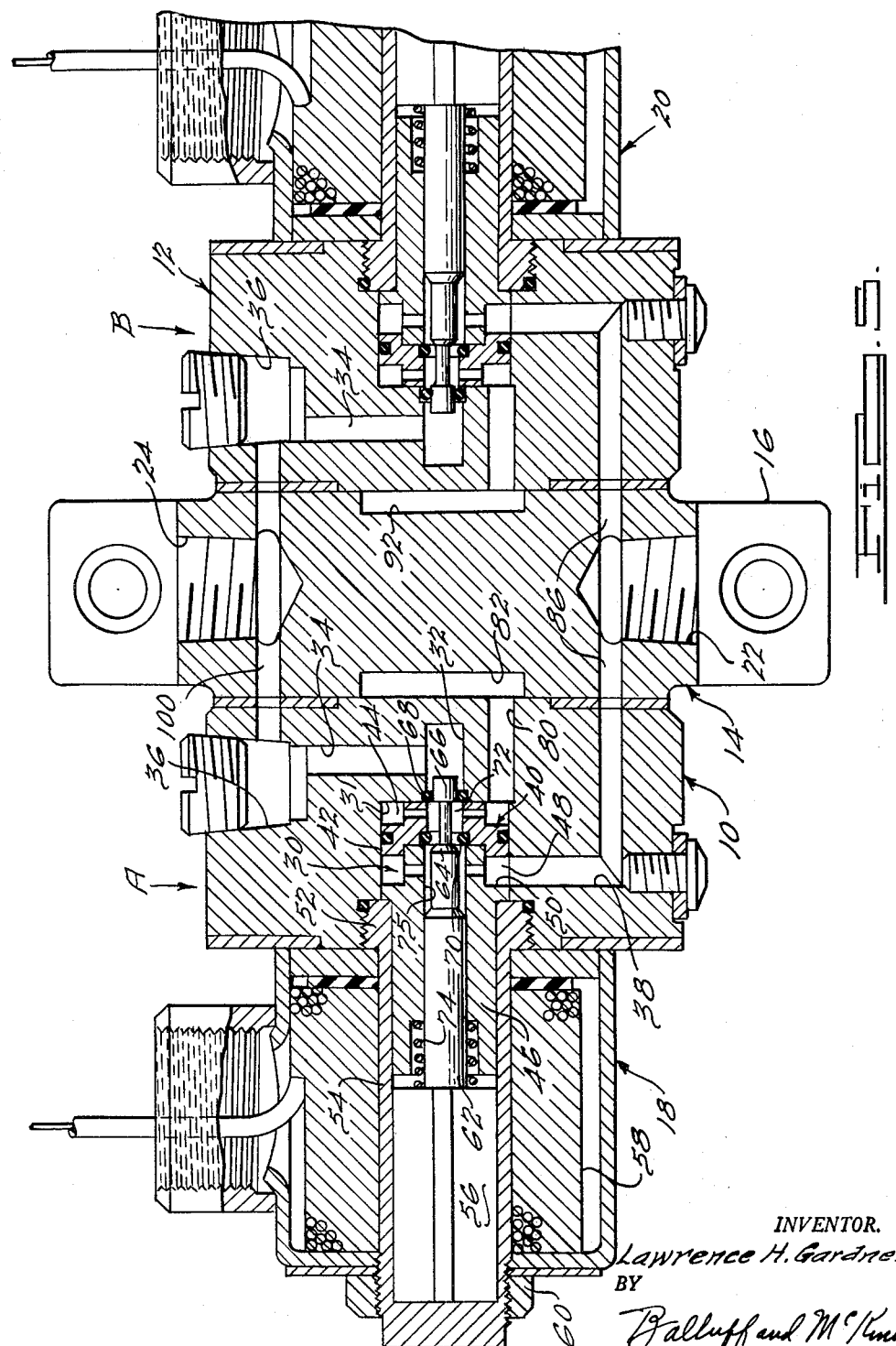

2,996,080
MANIFOLD VALVE ASSEMBLY
Lawrence H. Gardner, % Airmatic Valve Inc., 7317 Associate Ave., North Olmstead, Ohio
Filed Aug. 5, 1959, Ser. No. 831,820
3 Claims. (Cl. 137—623)

This invention relates to valves and has particular reference to a manifold valve assembly made from standard valve units.

A principal object of the invention is to provide a novel and inexpensive manifold valve assembly.

Another object of the invention is to provide a manifold valve assembly constructed of standard valve parts.

Other and further objects of the invention will be apparent from the following description and claims and may be understood by reference to the accompanying drawings, of which there are two sheets, which by way of illustration show preferred embodiments of the invention and what I now consider to be the best mode of applying the principles thereof. Other embodiments of the invention may be used without departing from the scope of the present invention as set forth in the appended claims.

In the drawings:

FIGURE 1 is a side elevational view of a valve assembly embodying the invention;

FIGURE 2 is a plan view thereof;

FIGURE 3 is a cross sectional view taken along the line 3—3 of FIGURE 2;

FIGURE 4 is a cross sectional view taken along the staggered line 4—4 of FIGURE 2; and FIGURE 5 is an enlarged longitudinal section view taken along the line 5—5 of FIGURE 1.

As illustrated in FIGURES 1 and 2 a valve assembly embodying the invention consists in general of a valve body 10, a valve body 12 and adapter 14 having mounting flanges 16. A solenoid 18 is mounted on the body 10 and a solenoid 20 is mounted on the body 12. The adapter 14 is provided with an inlet port 22, an exhaust port 24 and a pair of cylinder ports 26 and 28.

The valve body 10 is provided with a cylindrical valve chamber 30, the end wall 31 of which has an opening 32 therein which communicates with a cross-passage 34 which terminates in a port 36. The body 10 is further provided with a duct or passage 38 which opens into the valve chamber 30 through the cylindrical wall thereof at a point spaced from the end wall 31 of the chamber 30.

An annular valve seat member 40 having an inner end of smaller diameter than the diameter of the valve chamber is seated against the end wall 31 of the chamber 30 and at its other end includes an annular flange 42 which sealingly engages the cylindrical wall of the chamber 30 to define an annular passage 44 between the flange 42 and the chamber end wall. A tubular valve guide element 46 having an annular shoulder 50 spaced from the valve seat member 40 cooperates with the flange 42 thereof to define an annular passage 48. The outer periphery of the flange 50 has a close fit in the valve chamber 30. The threaded end 52 of a supporting tube 54 is threadedly secured in the outer end of the valve chamber 30 and reacts against the flange 50 of the guide 46 for securing the latter against the valve member 40 and it in turn seated against the end wall of the valve chamber 30. The core 56 of the solenoid 18 is axially slideable in the tube 54 and the coil 58 of the solenoid 18 is mounted on the tube 54 and secured in position thereon by a nut 60 threaded on the outer end of the tube 54.

A valve stem 62 projecting from one end of the core 56 extends through the guide 46 and is shaped to form valve members 64 and 66. As shown in FIGURE 5 valve member 66 is seated within an O-ring 68 which forms a stationary valve seat, such O-ring 68 being disposed and secured in an annular groove in the end wall of the chamber 30 and secured therein by the reduced end of the valve member 40. The valve member 66 and the valve seat 68, thus form a valve 66—68 which is shown as closed.

The valve member 64 is cooperable with an O-ring 70 which is seated in an annular groove in the valve seat member 40 around the passage 72 therein. When the valve stem 62 moves to the right the valve member 64 will seat against the inside of the ring 70 and the valve member 66 will move away from its seat 68. A spring 74 disposed around the stem 62 reacts against the guide 46 and the core 56 for biasing the latter so as to maintain valve 64—70 open and to maintain valve 66—68 closed. Radially extending passages in the reduced end of the valve seat member 40 establish communication between the passage 72 and the annular passage 44. Radially extending passages in the end of the guide 46 establish communication between the passage 75 formed internally of the guide 46 and the annular passage 48 around the end of the guide.

The annular valve chamber 44 communicates through passage 80 with a cavity 82 which communicates through passage 84 with cylinder port 28. Thus with the valve parts just described and hereinafter referred to as valve A and arranged as illustrated, the inlet port 22 is in communication with cylinder port 28 by means of cross-passage 86, passage 38, annular valve chamber 48, the radially extending passages within the guide 46, passage 75, open valve 64—70, passage 72, the radial passages in the valve seat member 40, the annular passage 44, passage 80, cavity 82 and passage 84. As the inlet port 22 is connected to a source of pressure fluid such as compressed air, air under pressure may thus be supplied to one end of an air cylinder on one side of the piston therein through a suitable conduit, not shown, which interconnects the port 28 and the end of such a cylinder.

The construction of the valve B on the right-hand side of the adapter 14 is the same as that just described, except that the cylinder port 26 of valve B communicates with the opposite end of such a work cylinder on the opposite side of a piston therein so that such end of the work cylinder can be ported to atmosphere while air under pressure is being supplied through port 28 to the other end thereof. The solenoids 18 and 20 of the valves are alternately engaged so that in use the movable valve elements 64 and 66 of valve A will be disposed opposite to the corresponding parts of valve B. Thus in valve B on the right-hand side of the adapter 14 the cylinder port 26 communicates by means of passage 90 with a cavity 92 provided in the end face of the adapter 14 and opposite the cavity 82.

The exhaust port 24 communicates with cross passage 100 which at its ends communicates with the ports 36 with which the passages 34 communicate. Thus when the valve 66—68 of valve A is closed the corresponding valve of valve B is open and ports one side of the cylinder to atmosphere through the exhaust passage 24.

From the foregoing, it will be seen that the manifold valve assembly comprises two identical valve units A and B and an adapter 14. Instead of using two identical valve units A and B, it would be possible to make one of such valves so that the valve 66—68 thereof would be normally open and the other normally closed. It would also be possible to rotate the valve B 180° from the position shown so that the passage 34 of valve B communicates with the cross passage 86 in the adapter, and so that the passage 38 and the valve B communicates with the passage 100 in the adapter. With the latter arrangement, the valve 66—68 of the valve B which is normally closed would be interposed between the air inlet port 22 and the passage 86 leading to the cavity 92 and the work port controlled by the valve B.

While I have illustrated and described preferred embodiments of my invention, it is understood that these are capable of modification, and I therefore do not wish to be limited to the precise details set forth but desire to avail myself of such changes and alterations as fall within the purview of the following claims.

I claim:

1. A manifold valve for controlling the supply and exhaust of air to and from a work cylinder, comprising a pair of valves mounted on an adapter, each valve including a valve body having a cylindrical valve chamber opening from one end thereof, an annular valve seat member having an inner end of smaller diameter than the diameter of said valve chamber seated against the end wall of said chamber, said valve seat member having an annular flange at its other end sealingly engaging the cylindrical wall of said chamber to define an annular passage between said flange and the chamber end wall, a valve guide element having an annular shoulder spaced from said valve seat member to define a second annular passage between said valve seat member and said valve guide element, said valve seat member having an axial passage therein, said valve body having a bore opening from said end wall and aligned with the axial passage in said valve seat member, a valve stem in said valve guide element and extending therefrom through said axial passage, a radial passage in said valve seat member between the axial passage therein and said first annular passage, means defining a passage connecting said axial passage and said second annular passage, seal means providing a first valve seat between said bore and the axial passage in said valve seat member, other seal means providing a second valve seat between said axial passage and said second annular passage, said valve stem in one position thereof being engageable with said first valve seat to close communication between said bore and said first annular passage while establishing communication between the latter and said second annular passage, said valve stem in a second position thereof being engageable with said second valve seat to close communication between said annular passages while establishing communication between said first annular passage and said bore, said valve body having an air inlet port, an exhaust port and a work port therein, said work port being connected to said first annular passage and said inlet and exhaust ports being connected one to said bore and the other to said second annular passage, and means for moving said valve stem from one of said positions to the other, said adapter having an air inlet port communicating with the air inlet ports of said valves, an exhaust port communicating with the exhaust ports of said valves and a pair of work ports, one communicating with each work port of one of said valves.

2. A manifold valve according to claim 1 wherein said valves are aligned and said adapter is mounted therebetween and secured to the valve bodies thereof.

3. A manifold valve according to claim 1 wherein said means normally position each said valve stem in sealing engagement with its said first valve seat.

References Cited in the file of this patent
UNITED STATES PATENTS

| | | |
|---|---|---|
| 1,083,810 | Engberg | Jan. 6, 1914 |
| 2,700,307 | Thoresen | Jan. 25, 1955 |
| 2,713,989 | Bryant | July 26, 1955 |